United States Patent [19]

Sanford

[11] 4,441,457
[45] Apr. 10, 1984

[54] BIRD FEEDER STAND

[76] Inventor: Doyle M. Sanford, 867 Broadmoor St., El Paso, Tex. 79912

[21] Appl. No.: 380,332

[22] Filed: May 21, 1982

[51] Int. Cl.³ .............................................. A01K 5/00
[52] U.S. Cl. .................................. 119/51 R; 119/51.5
[58] Field of Search ....................... 119/51 R, 51.5, 61

[56] References Cited

U.S. PATENT DOCUMENTS

| | | | |
|---|---|---|---|
| 2,789,532 | 4/1957 | Hoebing | 119/51 R |
| 2,887,988 | 5/1959 | Cottongim | 119/51.5 |
| 2,974,633 | 3/1961 | Whidden | 119/61 X |
| 3,292,589 | 12/1966 | Williams | 119/77 |
| 3,301,220 | 1/1967 | Queen | 119/77 |
| 3,441,003 | 4/1969 | Du Mond et al. | 119/61 |

FOREIGN PATENT DOCUMENTS 2035033  6/1980  United Kingdom ............... 119/51.5

Primary Examiner—Hugh R. Chamblee
Attorney, Agent, or Firm—Edward L. Brown, Jr.

[57] ABSTRACT

A bird feeder stand adapted to support all types of feeders and planters having a water-filled base member supporting a vertically extending support post from the center thereof. The feeders are hung from cantilevered arms while their bottoms are supported from lateral movement by adjustable brackets slidable on the support post.

2 Claims, 4 Drawing Figures

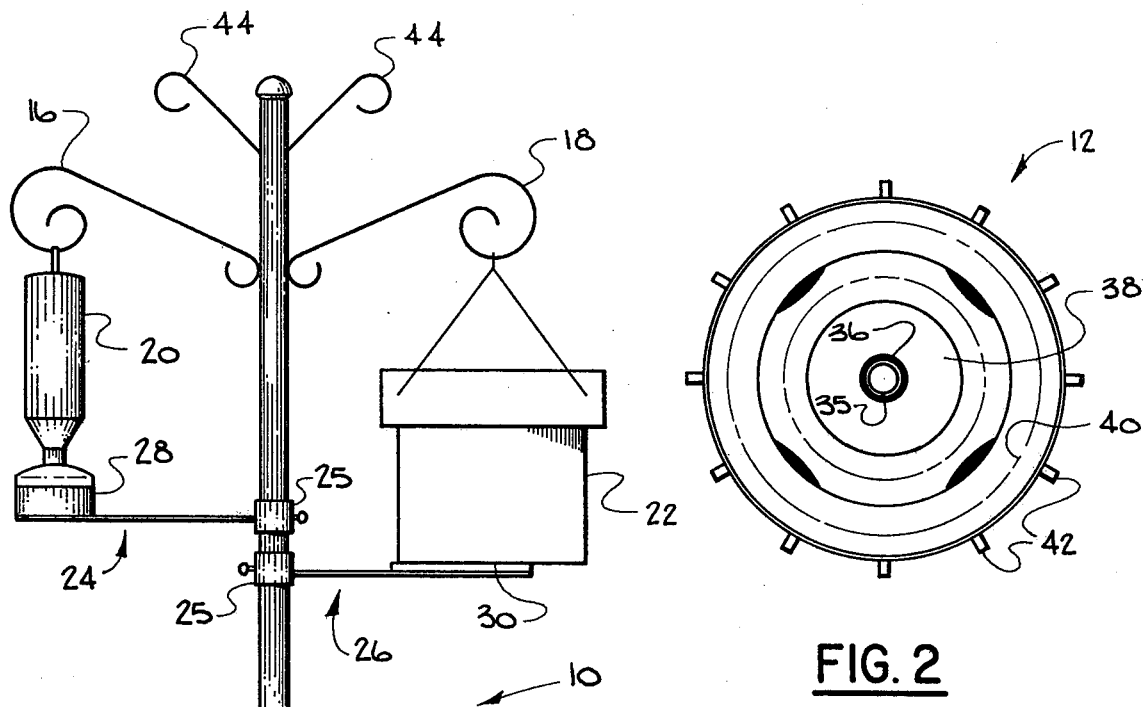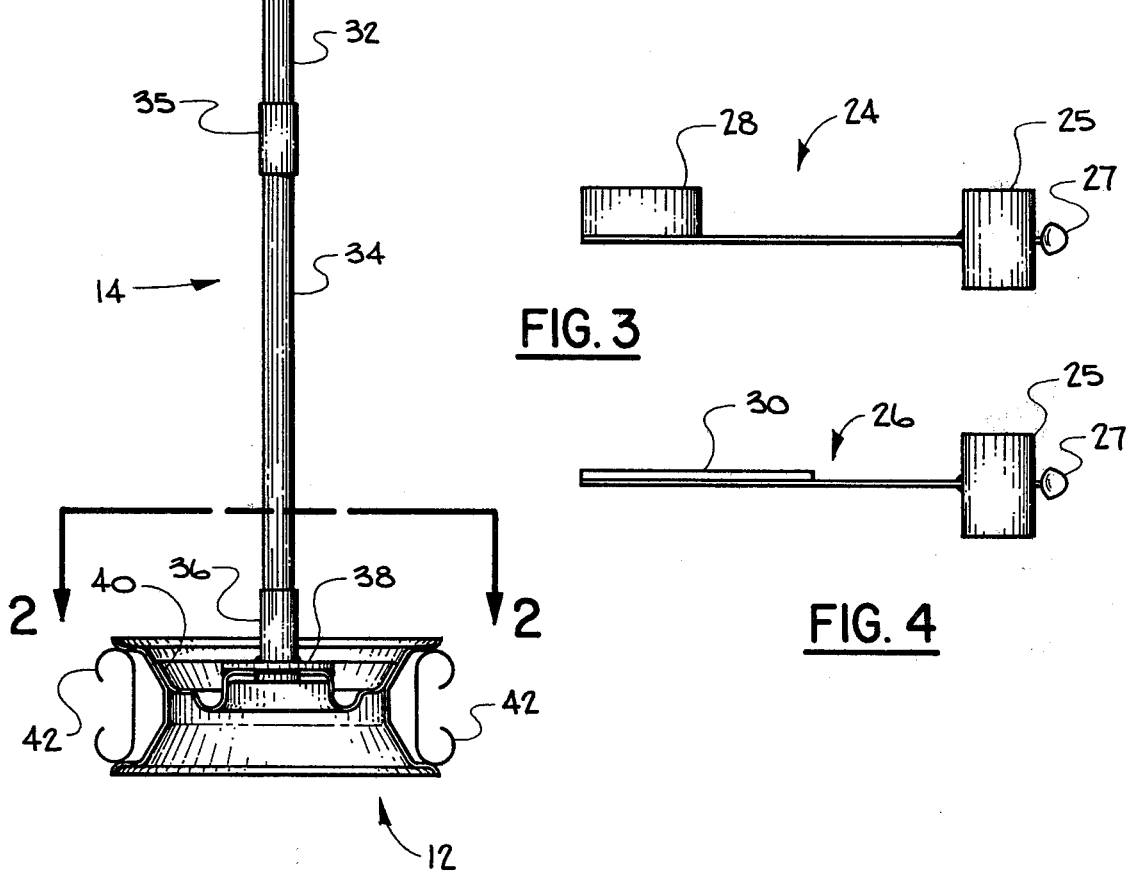

BIRD FEEDER STAND

BACKGROUND OF THE INVENTION

The present invention relates to a bird feeder stand which can be adjusted to support various different sizes and shapes of feeders. The portable stand allows the feeders to be set in close proximity to the windows, or on patios so that various wild birds can be watched from inside the house. The stand includes a center support post extending up from a base with a series of cantilever support arms extending outwardly therefrom. The various shaped feeders are hung from the support arms while the bottom of the feeder is engaged by an adjustable bracket to prevent the feeder from swinging in the wind. The base of the feeder includes a bowl-shaped top portion which is filled with water during use to prevent ants from reaching the sugar water of a hummingbird feeder. The feeder stand breaks down into a plurality of parts, allowing it to be boxed for shipping and easily assembled.

It is therefore the principal object of the present invention to provide a bird feeder stand for hummingbirds, as well as other wild birds, which is readily disassembled and packed for shipment.

Another object of the present invention is to provide a bird feeder stand which includes a water trough which extends completely around the vertical support post of the stand.

Additional objects and advantages will become apparent to those skilled in the art from the reading of the following detailed description of a preferred embodiment of the invention when taken in conjunction with the accompanying drawings.

BRIEF DESCRIPTION OF THE DRAWINGS

FIG. 1 is a side elevational view of the bird feeder stand, with the base member shown in section;

FIG. 2 is a top view of the base member taken along lines 2—2 of FIG. 1;

FIG. 3 is an elevational view to an enlarged scale of an adjustable bracket; and FIG. 4 is an elevational view to an enlarged scale of a second type of adjustable bracket.

DESCRIPTION OF THE PREFERRED EMBODIMENT

In FIG. 1 the bird feeder stand is generally identified by reference numeral 10. The feeder 10 comprises a base member 12 which supports a vertically positioned support post 14 which in turn carries a pair of cantilevered support arms 16 and 18. Arms 16 and 18 are curled downward in a hook shape at their outer ends for supporting hummingbird feeder 10 and a bird seed feeder 22, respectively. Positioned under feeder 20 is an adjustable bracket 24, shown in detail in FIG. 3, which includes a collar 25 and set screw 27 for adjustably positioning the bracket on support post 14. Located at the outer end of bracket 24 is a cup member 28 which encompasses the lower end of the hummingbird feeder 20 and prevents it from swaying in the wind while providing some degree of vertical support. Similar bracket 26 supports feeder 22 in a similar manner, as seen in detail in FIG. 4, with the exception of a flat support plate 30 located at the outer end thereof for providing additional vertical support to the feeder. Both the brackets 24 and 26 can be adjustably positioned at any point on post 14 to accommodate different sized feeders or hanging plants which can also be carried on the stand 10. Vertical support post 14 is made up of two sections 32 and 34 joined by a sleeve coupling 35 which is fixed to one of the sections. Post 14 is in turn slidably received in a sleeve member 36 which is welded to base member 12. Base member 12, as can be clearly seen in FIGS. 1 and 2, is a modified automobile wheel rim with the mounting bolt and bearing holes in the center thereof covered by a circular plate 38. Plate 38 is welded around its periphery so as to provide a watertight bowl shape 40 on the top of the base member 12. Welded in the center of plate 38 is sleeve 36 which supports the vertical post 14. With the bowl 40 filled with water, a barrier is provided around post 14 so as to prevent ants from climbing the post and reaching the sugar water in the hummingbird feeder 20. Located around the periphery of base 12 are a plurality of wrought iron ornamental members 42. Attached to the upper end of post 14 are a pair of ornamental members 44.

While the drawings illustrate a hummingbird sugar water feeder 20 and a seed feeder 22, other types of feeders or hanging plants can be utilized with the stand 10. The adjustable brackets 24 and 26 can be accordingly adjusted to fit whatever is hung from support arms 16 and 18.

Having described the invention with sufficient clarity to enable those familiar with the art to construct and use it, I claim:

1. A bird feeder stand which supports various types of feeders comprising:

a base member fabricated from an automobile wheel rim having a bowl-shaped top portion and a center opening therethrough;

a vertically and concentrically positioned support post with a sealing plate means attachable to the lower end thereof, the sealing plate means being attachable to the base member so as to seal the center opening and form a watertight top portion for retention of water; and support arms attached to the support post extending outwardly therefrom adapted for cantilever support of hanging type bird feeders and watering devices.

2. A bird feeder stand as set forth in claim 1, including adjustable bracket means releasably engageable with the support post at any vertical position on the support post for additional support to said bird feeders.

* * * * *